Sept. 24, 1957  H. V. D. STEWART  2,807,484
SELF-RENEWING ROD PACKING
Filed Sept. 8, 1950

INVENTOR
HERMAN V. D. STEWART

BY

ATTORNEYS

United States Patent Office

2,807,484
Patented Sept. 24, 1957

2,807,484

SELF-RENEWING ROD PACKING

Herman V. D. Stewart, Glendale, Calif.

Application September 8, 1950, Serial No. 183,803

1 Claim. (Cl. 286—30)

My invention has to do with packings, and, in its more particular aspects, relates to packings for reciprocating members such for instance as pump rods and the like.

It is an object of the invention to provide a packing of this character which is so designed and constructed that it not only at all times provides an efficient seal, but which also provides a self-renewing seal portion which continues the effective sealing function of the packing, despite wear of the packing member.

Another object is to provide a sleeve-like packing member having in cooperation therewith a novel element which so acts upon the end of the packing sleeve as to form a self-renewing lip sealing portion.

Other objects and advantages will appear hereinafter.

Without intending thereby to limit the broader scope of the invention as defined by the accompanying claim I shall now describe presently preferred embodiments of my invention, for which purpose I shall refer to the accompanying drawings, wherein:

Figure 1:
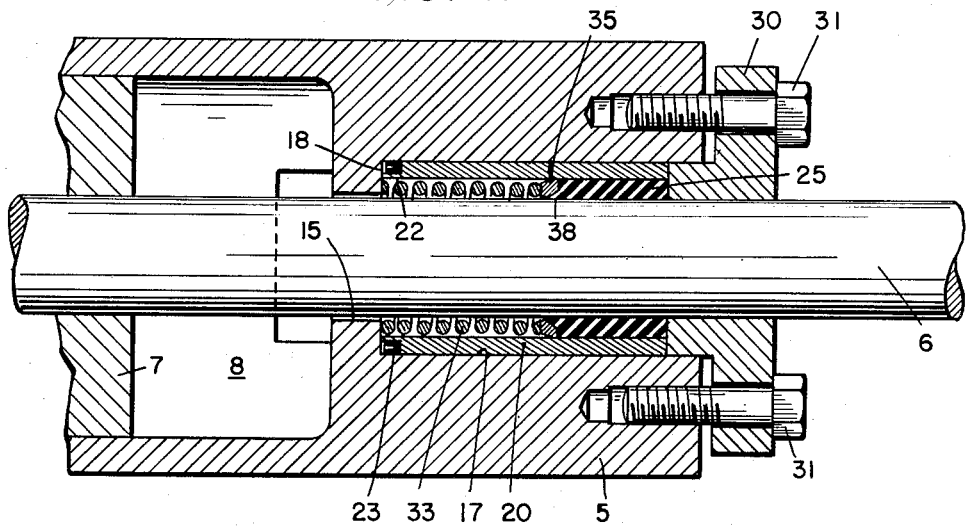
Figure 1 is a medial longitudinal section of a fragment of a pump housing and piston assembly utilizing my invention.
Figure 2:
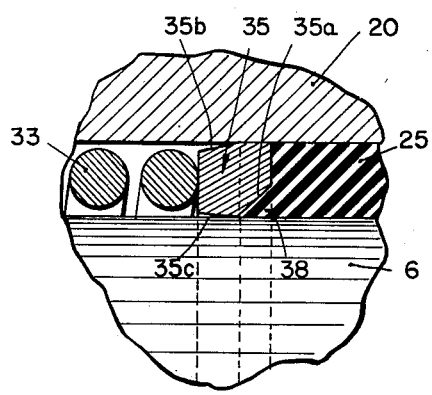
Fig. 2 is an enlarged fragmentary sectional view of Fig. 1.

By way of explaining my invention and having reference to the drawings, the numeral 5 denotes, for instance, a pump housing in which a piston rod 6 reciprocates. 7 denotes the piston and 8 the pressure chamber of the pump.

The housing 5 has a rod bore 15 presenting an enlarged diameter portion 17 providing an annular shoulder 18. A sleeve or spacer 20 is mounted in the bore and has a reduced diameter inner end portion 22 providing an annular recess to receive a conventional U-ring seal 23, or a conventional O-ring may be substituted for the U-ring.

A rubber-like deformable packing sleeve 25 is mounted in the sleeve 20 around the piston rod, and a jam plate 30 is secured to the housing around the piston rod by means of screws 31. The sleeve 25 is unitary or integrated, as distinguished from being laminated or composed of separate concentric sections, so that, in cross-section, its inner end will always present a unitary surface.

A compression spring 33 is provided in the bore, the spring bearing at its inner end against shoulder 18 and at its outer end against a ring 35 to be described.

The packing sleeve 25 is preferably manufactured to present an integral bevelled lip portion 38 at its inner end, and the ring 35 presents an inwardly-bevelled end surface 35a disposed to conform to and engage the outer surface of the lip portion. Thus it will be observed that the axially outer end of the ring presents radially inner and outer annular sleeve-engaging surface portions disposed angularly to each other and to the longitudinal axis of the sleeve, said radially inner and outer surface portions converging in a direction toward the axially inner end surface of the sleeve, the radially inner one of said surface portions inclining toward the axially inner end of the sleeve in a direction radially away from the longitudinal axis of the sleeve at an angle to the longitudinal axis of the sleeve which is less than that of the radially outer one of the radial surface portions with respect to the inner peripheral surface of the cylinder, both angles being measured from the respective inner and outer radial surface portions toward the axially inner end surface of the sleeve to the longitudinal axis of the sleeve and the inner peripheral surface of the cylinder, respectively. This relative formation of the sleeve-engaging surfaces of the ring so controls the flow of the packing material when the unitary sleeve is placed under axial compression as to compensate for the relatively greater wear on the inner surface portion of the sleeve than on its outer surface portion.

The spring 33 constantly forces the ring 35 against the inner end of the packing sleeve, thereby slightly compressing the inner end of the packing sleeve, so that, with commencement of each pressure stroke, there is assurance that fluid pressure will act, with the spring, to further compress the inner end of the packing sleeve. This forces the inner and outer surfaces of the packing sleeve against the reciprocating rod and housing, respectively to different degrees. Thus, there is caused a slight but unequal extrusion of the packing at its inner and outer diameters, thereby constantly renewing the lip contour and, by virtue of the bevelled surface 35a of the ring, the lip 38 is constantly urged against the reciprocating rod. By this construction the sealing effectiveness of the packing is maintained until its length is substantially consumed.

Inasmuch as I show the ring 35 as being of relatively short length, I find it preferable to bevel the sides of the ring so that the ring somewhat tapers towards its rear end, to prevent cocking and binding of the ring. Such bevelled surfaces are shown at 35b, 35c. It will be understood, of course, that a longer ring, one in the nature of a sleeve, may be substituted for the short ring 35, in which case the bevelling 35b, 35c may be omitted.

As is true with conventional rubber packing rings or sleeves, the sleeve 25 may be diagonally split throughout its length, to facilitate installation, although the split is not shown in the drawings.

While I have shown and described my invention as applied particularly to reciprocating pumps, it will be understood that the self-renewing lip principle described is useful for all hydraulic or gas pressure applications utilizing a rod which must be sealed against leakage.

Figure 4:
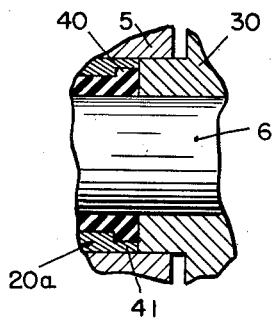
Fig. 4 is a fragmentary sectional view showing a further modified form.

In the form of device shown in Fig. 1, the spring 33 also holds the packing sleeve in position on the return stroke of the rod, when friction between the sleeve and rod tends to move the sleeve in the direction of movement of the rod. However, in the variational form of packing sleeve shown in Fig. 4, wherein the packing has a relatively thickened outer end portion or flange 40 which engages in the annular recess provided by the reduced inner diameter portion 41 of the spacer 20a, the packing is positively held by the sleeve against movement during the return stroke of the piston rod.

Figure 3:
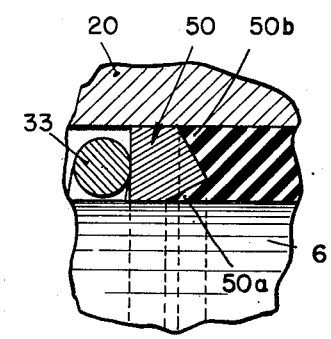
Fig. 3 is an enlarged fragmentary section showing a modified form of the invention.

In Fig. 3 I show a modified form of ring, here designated by the numeral 50. The outer end portion of the ring is shown as being of somewhat V-cross-section, having an inwardly bevelled end surface portion 50a and an outwardly bevelled surface opposite portion 50b.

I claim:

A rod packing device comprising, in combination, a cylinder, a rod mounted to reciprocate in the cylinder, a deformable, elongated packing sleeve of a length greater than its thickness mounted in the cylinder around said rod, said sleeve being solid and unseparated in section, abutment means in the cylinder against which the axially outer end of said sleeve abuts, a ring mounted in the cylinder and having a rod-passing bore through which said rod reciprocally extends, the axially outer end of said ring presenting a sleeve-engaging surface mating with and engaging the entire axially inner end surface of said sleeve and composed of radially inner and outer annular surface portions disposed angularly to each other and to the longitudinal axis of the sleeve, said radially inner and outer surface portions converging in a direction toward the axially inner end surface of said sleeve, the radially inner one of the last-named surface portions inclining toward the axially inner end of said sleeve in a direction radially away from the longitudinal axis of said sleeve at an angle to the longitudinal axis of the sleeve which is less than that of the radially outer one of said radial surface portions with respect to the inner peripheral surface of the cylinder, both angles being measured from the respective inner and outer radial surface portions toward the axially inner end surface of the sleeve to the longitudinal axis of the sleeve and the inner peripheral surface of the cylinder, respectively, and a compression spring resiliently urging said ring toward the axially inner end of said sleeve; said ring being further characterized by having its inner and outer peripheral surfaces tapered toward its axially inner end throughout at least a portion of the length of said ring.

References Cited in the file of this patent

UNITED STATES PATENTS

| | | |
|---|---|---|
| 534,575 | Platts et al. | Feb. 19, 1895 |
| 786,976 | Law | Apr. 11, 1905 |
| 1,868,199 | Pelterie | July 19, 1932 |
| 2,090,769 | Weisz | Aug. 24, 1937 |
| 2,150,529 | Tremolada | Mar. 14, 1939 |
| 2,204,915 | Sharp | June 18, 1940 |
| 2,232,293 | Toennies | Feb. 18, 1941 |
| 2,348,004 | Gruetjen | May 2, 1944 |
| 2,567,527 | Parks | Sept. 11, 1951 |

FOREIGN PATENTS

| | | |
|---|---|---|
| 308,651 | Germany | of 1918 |
| 599,500 | France | Jan. 13, 1926 |
| 567,346 | Great Britain | Feb. 9, 1945 |